US010533698B2

(12) United States Patent
Zhao (10) Patent No.: US 10,533,698 B2
(45) Date of Patent: *Jan. 14, 2020

(54) LOCKING DEVICE AND GIMBAL HAVING THE LOCKING DEVICE

(71) Applicant: SZ DJI OSMO TECHNOLOGY CO., LTD., Shenzhen (CN)

(72) Inventor: Yanchong Zhao, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 165 days.

This patent is subject to a terminal disclaimer.

(21) Appl. No.: 15/390,791

(22) Filed: Dec. 27, 2016

(65) Prior Publication Data

US 2017/0108161 A1 Apr. 20, 2017

Related U.S. Application Data

(63) Continuation of application No. PCT/CN2014/081048, filed on Jun. 27, 2014.

(51) Int. Cl.
*F16M 11/04* (2006.01)
*F16M 11/18* (2006.01)
(Continued)

(52) U.S. Cl.
CPC ......... *F16M 11/041* (2013.01); *F16M 11/123* (2013.01); *F16M 11/18* (2013.01); *G03B 17/561* (2013.01); *F16M 2200/027* (2013.01)

(58) Field of Classification Search
None
See application file for complete search history.

(56) References Cited

U.S. PATENT DOCUMENTS 5,798,589 A * 8/1998 Ohi .................. F16C 23/04
310/90
7,077,582 B2 7/2006 Johnson
(Continued)

FOREIGN PATENT DOCUMENTS

CN 201083950 Y 7/2008
CN 201340508 Y 11/2009
(Continued)

OTHER PUBLICATIONS

The World Intellectual Property Organization (WIPO) International Search Report for PCT/CN2014/081048 dated Feb. 4, 2015 p. 1-8.

*Primary Examiner* — Clayton E. LaBalle
*Assistant Examiner* — Dennis Hancock
(74) *Attorney, Agent, or Firm* — Anova Law Group, PLLC (57) ABSTRACT

A locking device and a gimbal thereof are provided. The locking device includes a mounting plate; a supporting plate slidably on the mounting plate; and a pressing device including a sliding block. The mounting plate includes a first surface, two first bosses, two first sliding grooves at inner sidewalls of the two first bosses, and a receiving groove. The supporting plate contains two second sliding grooves at positions corresponding to the first sliding grooves of the mounting plate. The sliding block is slidably disposed within the receiving groove and includes: a first side in proximity to a groove bottom, and a clamp fixing portion extending from the first side to lock the supporting plate with the mounting plate. When the sliding block is held within the second sliding groove, the supporting plate is tightened with the mounting plate by the clamp fixing portion.

25 Claims, 5 Drawing Sheets

(51) Int. Cl.
*F16M 11/12* (2006.01)
*G03B 17/56* (2006.01)

(56) References Cited

U.S. PATENT DOCUMENTS

| | | | | |
|---|---|---|---|---|
| 2008/0210025 | A1* | 9/2008 | Goossen | F16M 11/041 |
| | | | | 74/5.34 |
| 2010/0266270 | A1* | 10/2010 | Pizzo | G03B 17/00 |
| | | | | 396/420 |
| 2014/0099092 | A1* | 4/2014 | Di Leo | G03B 17/563 |
| | | | | 396/420 |
| 2017/0153532 | A1* | 6/2017 | Le | F16M 13/04 |

FOREIGN PATENT DOCUMENTS

| | | |
|---|---|---|
| CN | 201765421 U | 3/2011 |
| CN | 102192388 A | 9/2011 |
| CN | 202647108 U | 1/2013 |
| CN | 202720439 U | 2/2013 |
| CN | 203217225 U | 9/2013 |
| CN | 203286232 U | 11/2013 |
| CN | 203414721 U | 1/2014 |
| CN | 203907157 U | 10/2014 |
| CN | 203963419 U | 11/2014 |
| DE | 202004001608 U1 | 6/2004 |
| ES | 2357743 A | 4/2011 |
| JP | 2012105251 A | 5/2012 |

\* cited by examiner

LOCKING DEVICE AND GIMBAL HAVING THE LOCKING DEVICE

CROSS-REFERENCES TO RELATED APPLICATIONS

This application is a continuation application of International Application No. PCT/CN2014/081048, filed with the State Intellectual Property Office of P. R. China on Jun. 27, 2014, the entire content of which is incorporated herein by reference.

TECHNICAL FIELD

The present disclosure generally relates to imaging devices and, particularly relates to a locking device and a gimbal having the locking device.

BACKGROUND

A gimbal is a support used for mounting a video camera. The video camera is disposed on the gimbal. An orientation of the lens of the video camera can be adjusted to capture a target by adjusting the gimbal. A gimbal can be compatible with various types of video cameras or lenses, and the center of gravity on each axis of the gimbal can be adjusted. However, in existing mechanisms, the center of gravity is adjusted by relatively displacing various structural members of the gimbal. Since the structural members are often load-bearing members, an increased static friction between the structural members can lead to a difficult relative movement there-between. Moreover, a small relative displacement can have significant effects on the center of gravity, making it difficult to adjust the center of gravity.

Amateur and professional photographers can adjust an orientation of the gimbal, mount a camera or camcorder onto a quick release plate, mount the quick release plate with mounted camera or camcorder onto a fixing plate of the gimbal, and then fix the quick release plate by adjusting a locking mechanism of the quick release plate, such that an optimal imaging orientation and effect can be effected in an outdoor imaging. The existing locking mechanism of the quick release plate includes a first locking member, a second locking member and a plurality of springs configured on the second locking member. The existing locking mechanism is bulky and thus inconvenient to mount. The springs can swing while being compressed and released, which can result in a loose attachment of the springs when the quick release plate is being locked and released. The locking precision of the quick release plate is thus deteriorated.

SUMMARY

The present disclosure provides a locking device having a small size and convenient to assemble and disassemble. A center of gravity of the locking device can be quickly adjusted, and a locking precision for a quick release can be improved. The present disclosure also provides a gimbal having the locking device.

One aspect of the present disclosure includes a locking device. The locking device includes a mounting plate; a supporting plate slidably on the mounting plate and configured to mount an imaging device; and a pressing device including a sliding block. The mounting plate includes a first surface and two first sidewalls which are opposite to each other, two first bosses extending respectively at two opposite sides of the first surface, two first sliding grooves being respectively at inner sidewalls of the two first bosses, and a receiving groove being at one of the two first sidewalls. The supporting plate contains two second sliding grooves respectively on two outer sidewalls thereof at positions corresponding to the first sliding grooves of the mounting plate, the second sliding grooves matching the first sliding grooves. The sliding block is slidably disposed within the receiving groove and includes: a first side in proximity to a groove bottom of the receiving groove, and a clamp fixing portion extending from the first side in a direction towards the groove bottom and configured to lock the supporting plate with the mounting plate. When the sliding block is held within the second sliding groove, the supporting plate is tightened with the mounting plate by the clamp fixing portion.

In some embodiments, the first sliding grooves and the second sliding grooves can be dovetail grooves.

In some embodiments, a groove bottom of the first sliding groove can be provided with a threaded hole, and the locking device can further include a spring, a bolt, a pin and a lever; the spring can be disposed between the groove bottom and the first side; the sliding block can further include a second side opposite to the first side; the lever can be disposed at the second side and provided with a first through-hole for receiving the pin; and the bolt can sequentially pass through the pin, the sliding block and the spring and can be threadedly connected with the threaded hole.

In some embodiments, the second side can be provided with a first receiving groove having a shape of two squares with one inside the other; the central portion of the first receiving groove can form a cylinder having a circular through-hole, the bolt passing through the circular through-hole; the locking device can further include a spacer having a shape and a size respectively match a shape and a size of the first receiving groove; and the spacer can be received within the first receiving groove and contacts with the lever.

In some embodiments, a thickness of the spacer can be greater than or equal to a depth of the first receiving groove.

In some embodiments, the spacer can be made of polyoxymethylene (POM).

In some embodiments, the receiving groove can include two groove sides disposed perpendicular to the groove bottom and opposite to each other; two first sliding portions can be respectively disposed on the two groove sides; two second sliding portions can be respectively disposed on two outer sidewalls of the sliding block at positions corresponding to the first sliding portions, the second sliding portions matching the first sliding portions.

In some embodiments, the first sliding portions can be sliding grooves, and the second sliding portions can be sliders.

In some embodiments, the first sliding positions can be sliders, and the second sliding portions can be sliding grooves.

In some embodiments, the receiving groove is configured to extend from the first sidewall towards a center of the first surface and run through a portion of the first boss to form a notch on the first boss; the notch can be in communication with the receiving groove; the clamp fixing portion can protrude out from the first side and form an inclined surface which inclines relative to the first side; and when the sliding block is held within the second sliding groove, the inclined surface can be received within the notch.

In some embodiments, the locking device can further include a first adaptor including a first pressing block and a second pressing block which are disposed opposite to each other. The first pressing block and the second pressing block can form two circular slots there-between; the first pressing block and the second pressing block can be jointly locked by a first screw; the mounting plate can be fixed on the second pressing block; and a nut of the first screws can be fixed to a first lever.

Another aspect of the present disclosure includes a gimbal for carrying an imaging device. The gimbal includes a first supporting frame, including two first pillars and two guiding posts substantially perpendicular to the two first pillars; the disclosed locking device, disposed on the two guiding posts for carrying the imaging device; a second supporting frame, hinged to the first supporting frame and capable of driving a rotation of the first supporting frame, and a third supporting frame, hinged to the second supporting frame and capable of driving a rotation of the second supporting frame.

In some embodiments, the first pillars, the guiding posts and the third supporting frame are hollow. Inner walls of the first pillars, the guiding posts and the third supporting frame are provided with internal threads, a body portion of the driving device is provided with external threads, and the external threads match the internal threads to connect the driving device with the first pillars, the guiding posts or the third supporting frame.

In some embodiments, the second supporting frame can include two second pillars and a first driving device, one of the two second pillars can be hinged to a rotating shaft of one of the first pillars, and the other one of the two second pillars can be hinged to a rotating shaft of the other one of the first pillars through the first driving device.

In some embodiments, the third supporting frame can include a third pillar, a second driving device and a connecting plate; the second driving device can be rotatably connected to the second pillars to drive the second supporting frame; the second driving device can be fixed to one end of the third pillar, and a driving shaft of the second driving device can be fixedly connected with the second pillars to drive a rotation of the second pillars and a rotation of the second supporting frame; and the other end of the third pillar can be connected to the connecting plate.

In some embodiments, the gimbal can further include a driving portion and a handle portion, the driving portion can be a brushless motor having a rotor connected to the connecting plate and a stator fixed to the handle portion, and the driving portion can drive a rotation of the third supporting frame.

In some embodiments, the connecting plate can be a hollow cylindrical structure, a cylindrical receiving hole can be provided therein. An inner wall of the receiving hole can be provided with an internal thread, an external thread of the driving device can match the internal thread of the receiving holes so as to fixedly connect the driving device with the connecting plate of the third supporting frame.

In some embodiments, the first sliding grooves and the second grooves can be dovetail grooves.

In some embodiments, a groove bottom of the first sliding groove can be provided with a threaded hole, and the locking device further includes a spring, a bolt, a pin and a lever; the spring can be disposed between the groove bottom and the first side; the sliding block further can include a second side opposite to the first side; the lever can be disposed at the second side and provided with a first through-hole for receiving the pin; and the bolt can sequentially pass through the pin, the sliding block and the spring and can be threadedly connected with the threaded hole.

In some embodiments, the second side can be provided with a first receiving groove having a shape of two squares with one inside the other; the central portion of the first receiving groove can form a cylinder having a circular through-hole, the bolt passing through the circular through-hole; the locking device can further include a spacer having a shape and a size respectively match a shape and a size of the first receiving groove; and the spacer can be received within the first receiving groove and contacts with the lever.

In some embodiments, a thickness of the spacer can be greater than or equal to a depth of the first receiving groove.

In some embodiments, the spacer can be made of polyoxymethylene (POM).

In some embodiments, the receiving groove can include two groove sides disposed perpendicular to the groove bottom and opposite to each other; two first sliding portions can be respectively disposed on the two groove sides; and two second sliding portions can be respectively disposed on two outer sidewalls of the sliding block at positions corresponding to the first sliding portions, the second sliding portions matching the first sliding portions.

In some embodiments, the first sliding portions can be sliding grooves, and the second sliding portions can be sliders.

In some embodiments, the first sliding positions can be sliders, and the second sliding portions can be sliding grooves.

In some embodiments, the receiving groove can be configured to extend from the first sidewall towards a center of the first surface and run through a portion of the first boss to form a notch on the first boss; the notch can be in communication with the receiving groove; the clamp fixing portion can protrude out from the first side and form an inclined surface which inclines relative to the first side; and when the sliding block is held within the second sliding groove, the inclined surface can be received within the notch.

In some embodiments, the locking device can further include a first adaptor including a first pressing block and a second pressing block which are disposed opposite to each other; two circular slots can be formed between the first pressing block and the second pressing block; the first pressing block and the second pressing block can be jointly locked by a first screw; the mounting plate can be fixed on the second pressing block; and a nut of the first screw can be fixed to a first lever; and the first adaptor can be fixed on the guiding posts if the first screw is tightened, and locking device can be capable of sliding on the guiding posts along a longitudinal direction thereof if the first screw is released.

As compared with the prior art, the supporting plate of the locking device of present disclosure can be slidably disposed on the mounting plate, and the supporting plate can be tighten with the mounting plate by the pressing device. Therefore, the mounting plate can be tightened at arbitrary position on the supporting plate by the pressing device. The locking precision of the mounting plate can be improved. The locking device is small in size and easy to assemble and disassemble. The gimbal can enable the supporting plate to slide on the mounting plate by the locking device, so as to finely adjust the center of gravity of the first supporting frame. The center of gravity of the first supporting frame, the locking device and the imaging device as a whole falls on the rotating shaft of the first driving device, such that the center of gravity of the gimbal can be quickly adjusted. Therefore, the center of gravity of the gimbal can be adjusted by the locking device.

DETAILED DESCRIPTION

The technical solution in the embodiments of the present disclosure will be described clearly and completely in the following detailed description in combination with the drawings. It should be apparent that embodiments described herein are only some embodiments of the present disclosure. All other embodiments obtained by those having ordinary skills in the art on the basis of the described embodiments of the present disclosure without inventive efforts should fall within the scope of the present disclosure.

Implementation of the present disclosure will be described in detail below, with reference to various exemplary embodiments.

Figure 3:
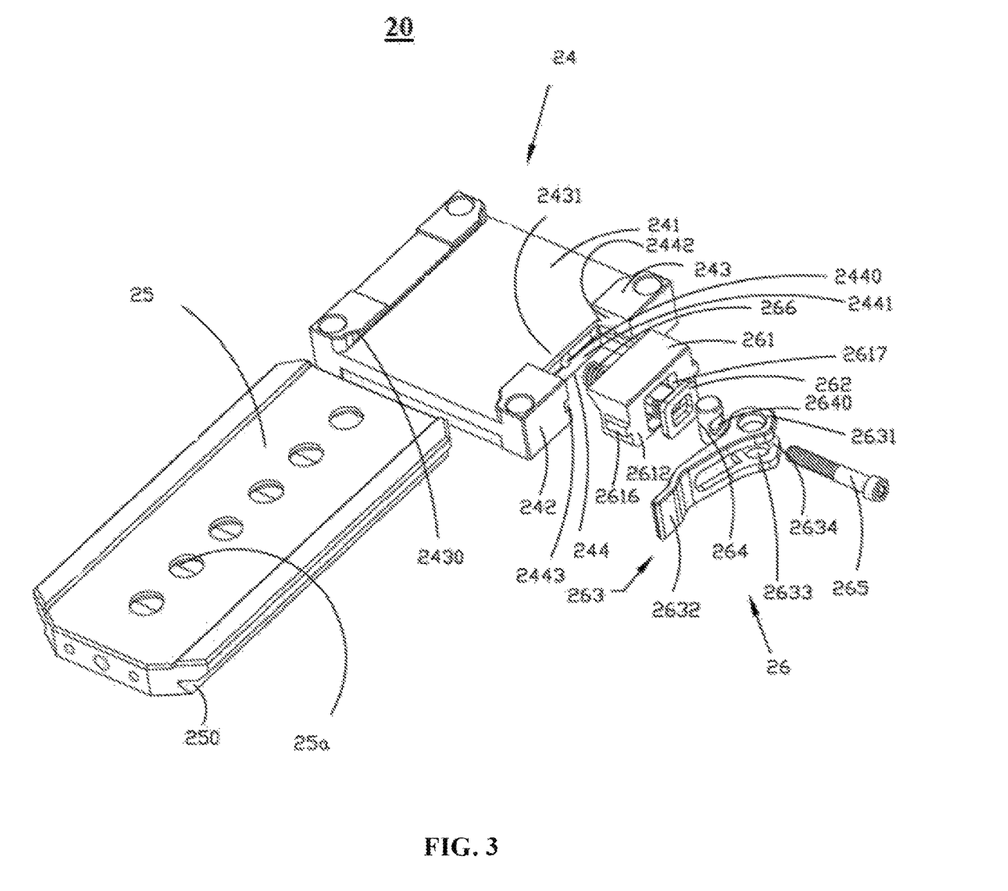
FIG. 3 is an exploded view of the locking device of FIG. 2 according to various embodiments of the present disclosure.
Figure 4:
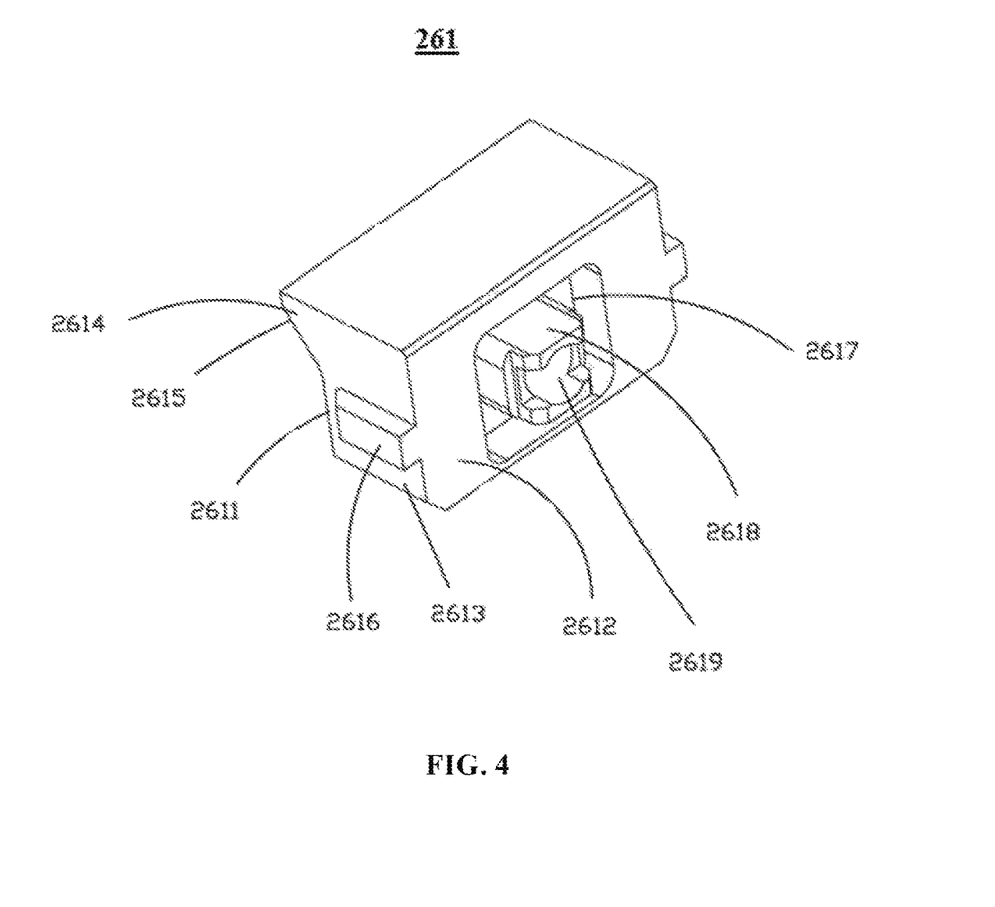
FIG. 4 is a perspective view of a sliding block in the locking device of FIG. 3 according to various embodiments of the present disclosure.
Figure 5:
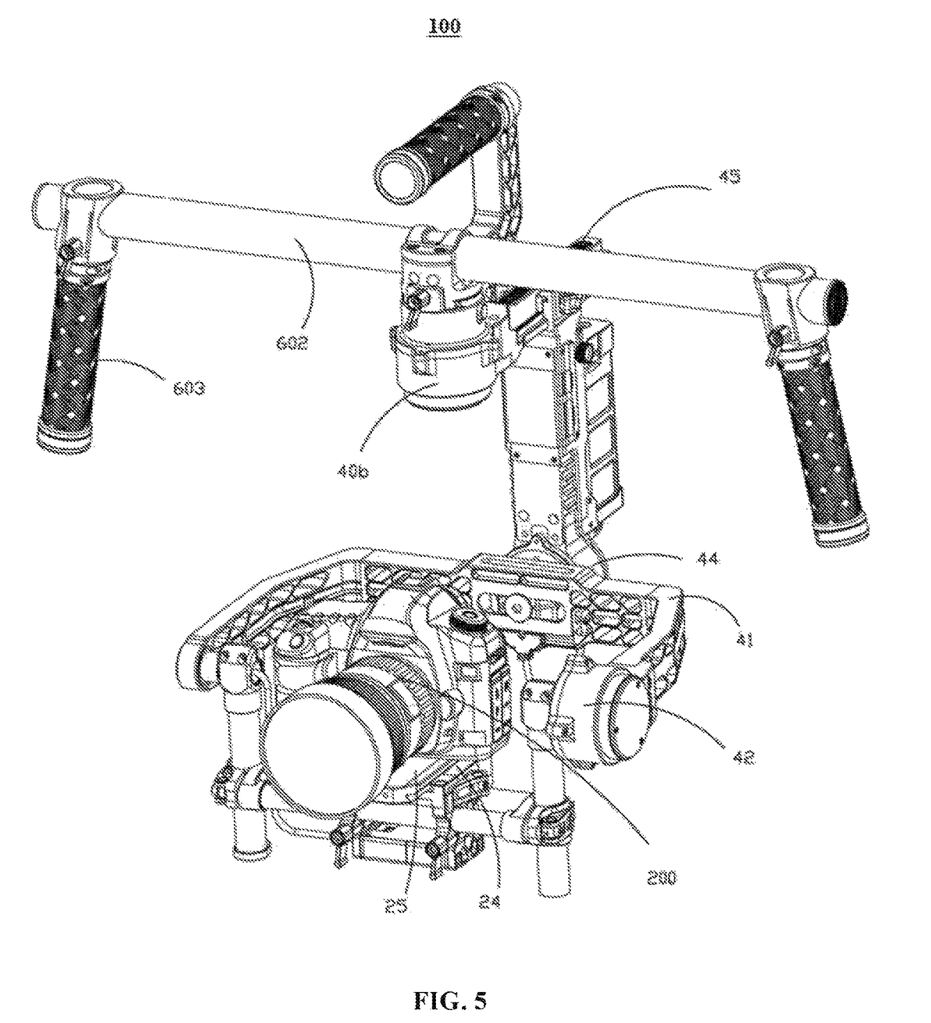
FIG. 5 illustrates a working condition of the gimbal of FIG. 1 according to various embodiments of the present disclosure.

Referring to FIGS. 1 to 4, the present disclosure provides a gimbal 100 used for carrying an imaging device 200 (as shown in FIG. 5). The imaging device 200 can be a camera, a camcorder or a lens. In some embodiments, the imaging device 200 is a camera.

Figure 1:
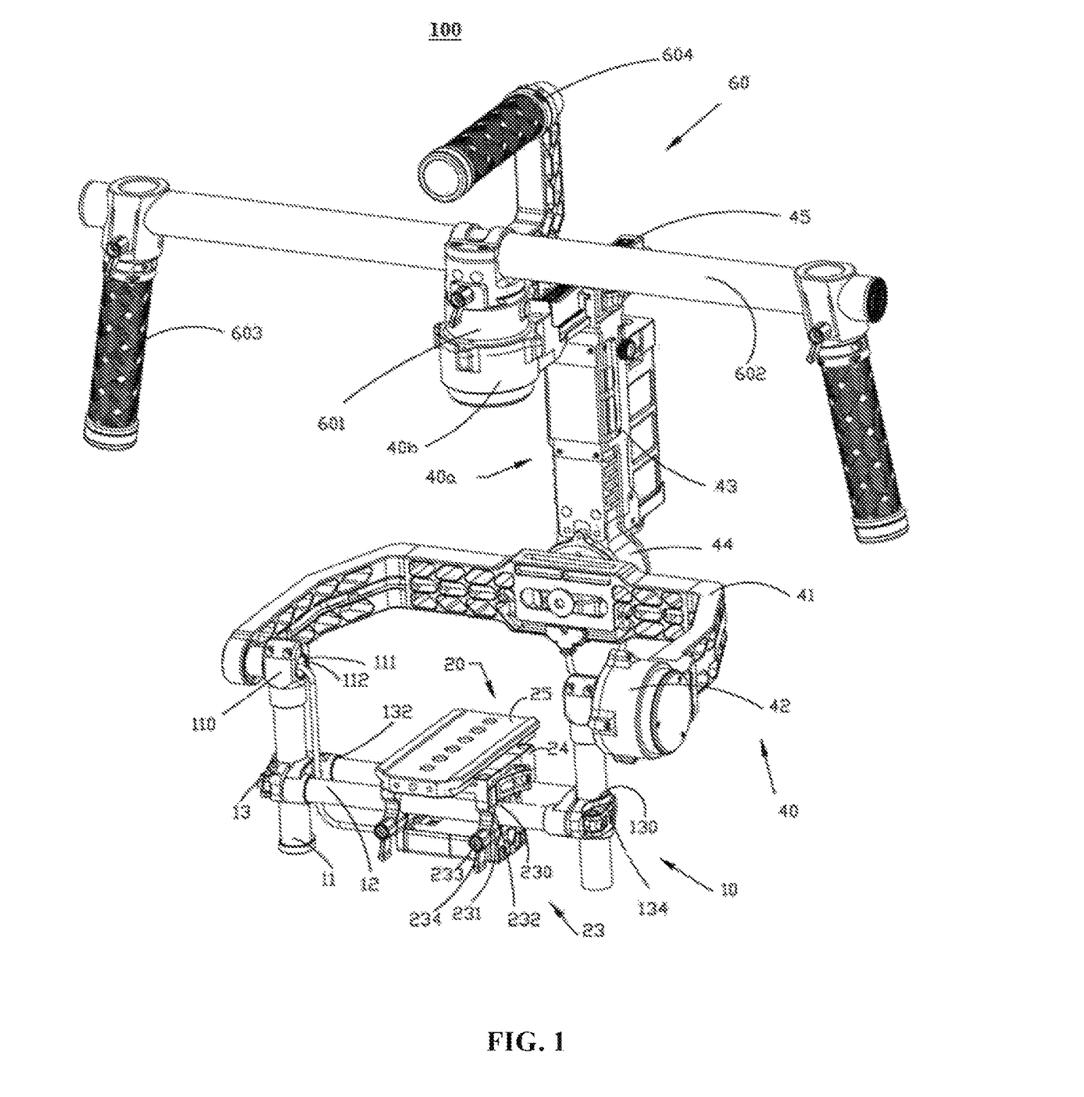
FIG. 1 is a perspective view of a gimbal according to an embodiment of the present disclosure.

The gimbal 100 can include a first supporting frame 10, a locking device 20 movably coupled on the first supporting frame 10, a second supporting frame 40 that is hinged to the first supporting frame 10 and capable of driving a rotation of the first supporting frame 10, a third supporting frame 40a that is hinged to the second supporting frame 40 and capable of driving a rotation of the second supporting frame 40, a driving portion 40b for driving a rotation of the third supporting frame 40a, and a handle portion 60.

The first supporting frame 10 can include two first pillars 11, two guiding posts 12 and two first clamping means 13. The two guiding posts 12 can be provided perpendicular to the two first pillars 11. The two guiding posts 12 can be movable along a longitudinal direction of the first pillars 11 by the first clamping means 13, and can be fixed at any position along the longitudinal direction on the first pillars 11 by the first clamping means 13.

In some embodiments, the first pillars 11 are cylindrical. Each one of the first pillars 11 can include a connecting end 110. The connecting end 110 can be provided with a through-hole 111. In some embodiments, an axial direction of the through-hole 111 can be substantially perpendicular to the longitudinal direction of the first pillar 11. A rotating shaft 112 can be provided in the through-hole 111. Alternatively, the first pillars 11 can be provided in other suitable shapes.

In some embodiments, the two guiding posts 12 are cylindrical. Alternatively, the guiding posts 12 can be provided in other suitable shapes.

Each one of the two first clamping means 13 can include a pillar clamping hole 130, two guiding post receiving portions 132 respectively arranged at two sides of the pillar clamping hole 130, and a clamp locking member 134.

An axial direction of the pillar clamping hole 130 can be substantially perpendicular to an axial direction of the guiding post receiving portions 132. A shape and size of the pillar clamping holes 130 can correspond to a shape and size of the first pillars 11, respectively. The two first pillars 11 can be respectively sleeved in corresponding pillar clamping holes 130.

Each one of the guiding post receiving portions 132 can receive an end of corresponding one of the guiding posts 12, such that the two guiding posts 12 are arranged substantially in parallel.

The clamp locking member 134 can be configured to lock the first clamping device 13 at an arbitrary position on the first pillar 11. In some instances, the clamp locking member 134 is a lock catch made of a metallic material.

Figure 2:
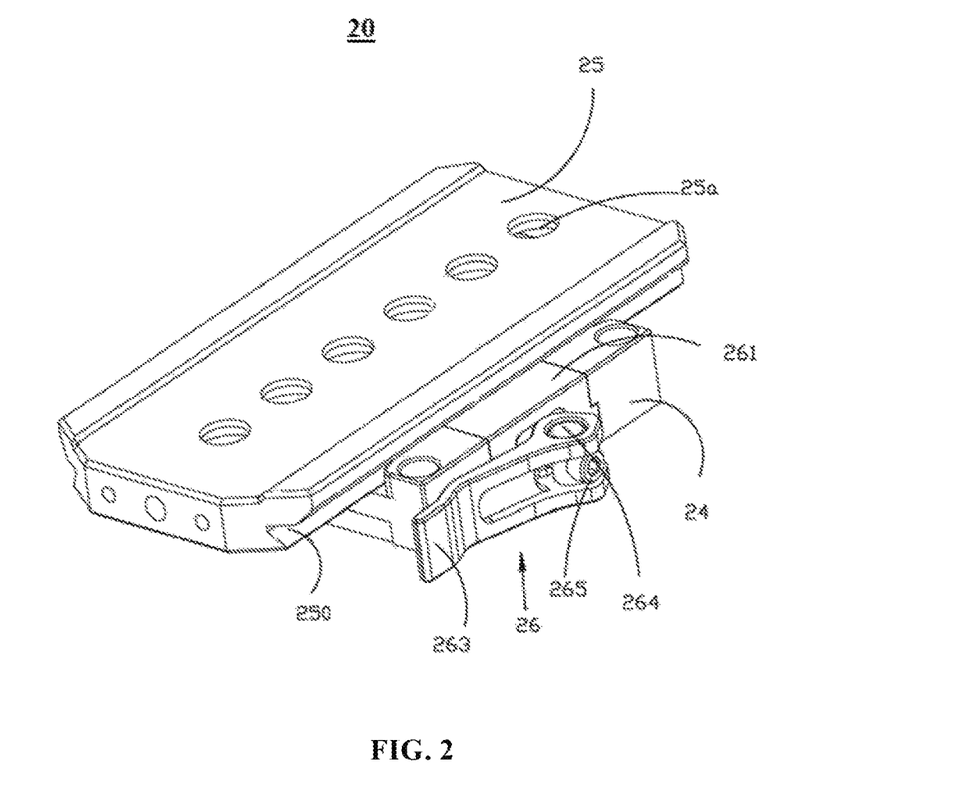
FIG. 2 is a perspective view of a locking device in the gimbal of FIG. 1 according to various embodiments of the present disclosure.

The locking device 20 can include a first adaptor 23 slidably disposed on the guiding posts 12, a mounting plate 24, a supporting plate 25 slidably disposed on the mounting plate 24, and a pressing device 26. The mounting plate 24 can be fixed on the first adaptor 23. In some embodiments, the mounting plate 24 can be fixed on the first adaptor 23 by a bolt. The supporting plate 25 can be slidably disposed on the mounting plate 24. The pressing device 26 can be disposed on a side of the mounting plate 24. The pressing device 26 can be configured to fix the supporting plate 25 at an arbitrary position on the mounting plate 24.

The first adaptor 23 can include a first pressing block 231 and a second pressing block 232 which are disposed facing toward each other, in order to regulate a sliding of the first adaptor 23. Two circular slots 230 can be formed between the first pressing block 231 and the second pressing block 232, and the guiding posts 12 can be inserted in the circular slots 230. The first pressing block 231 and the second pressing block 232 can be jointly locked by a first screw 233. The first adaptor 23 can be fixed on the guiding posts 12 when the first screw 233 is tightened. The first adaptor 23 can slide on the guiding posts 12 along a longitudinal direction thereof when the first screw 233 is released.

In some embodiments, a nut of the first screws 233 can be fixed to a first lever 234 which extends in a direction perpendicular to a longitudinal direction of the first screw 233. The lever 234 can be rotated in a tightening direction of the first screw 233 to tighten the first screw 233. On the other hand, the first lever 234 can be rotated in a direction opposite to the tightening direction of the first screw 233 to release the first screw 233, such that the first adaptor 23 can slide along the guiding posts 12. Alternatively, the first adaptor 23 can be adjusted by a lead screw mechanism.

The mounting plate 24 can be configured to fix the imaging device 200. The mounting plate 24 can be fixed on the second pressing block 232. The mounting plate 24 is an elongated rectangle block. The mounting plate 24 includes a first surface 241 which is distal from the second pressing block 232 and two first sidewalls 242 which are opposite to each other. The first surface 241 is perpendicularly connected with the first sidewalls 242. At two opposite sides of the first surface 241, two first bosses 243 respectively extended along a direction perpendicular to the first surface 241. In some embodiments, the two first bosses 243 are integrally formed with the mounting plate 24, and the outer sidewalls of the two first bosses 243 are respectively coplanar with the corresponding first sidewall 242. Inner sidewalls of the two first bosses 243 can be respectively provided with a first sliding groove 2430. The first sliding groove 2430 can be a dovetail sliding groove. In some embodiments, the first sliding groove 2430 can be provided in other suitable shapes.

In some embodiments, one of the first sidewalls 242 can be provided with a receiving groove 244 which extends from the first sidewall towards the center of the first surface 241. The receiving groove 244 can run through a portion of the first boss 243 to form a notch 2431 on the first boss 243. The notch 2431 can be in communication with the receiving groove 244. The receiving groove 244 can include a groove bottom 2441 and two groove sides 2442 disposed perpendicular to the groove bottom 2441. The groove bottom 2441 can be substantially parallel to the first sidewall 242. The groove bottom 2441 can be provided with a threaded hole 2440. The two groove sides 2442 can be substantially in parallel and disposed opposite to each other. Two first sliding portions 2443 can be respectively disposed on the two groove sides 2442. In some embodiments, each one of the two first sliding portions 2443 can be a sliding groove.

The supporting plate 25 can be provided with a plurality of uniformly disposed screw holes 25*a* along a longitudinal direction thereof. The screw holes 25*a* can be used to connect the imaging device 200 by screws. Imaging devices 200 of various specifications can be adapted by using the plurality of screw holes 25*a*. Furthermore, a position of the imaging device 200 on the mounting plate 25 can be adjusted by the plurality of screw holes 25*a*. In some embodiments, second sliding grooves 250 can be provided on two outer sidewalls of the supporting plate 25 at positions corresponding to the first sliding grooves 2430. The second sliding grooves 250 can match the first sliding grooves 2430. In some embodiments, the second sliding groove 250 can be dovetail sliding groove.

The pressing device 26 can include a sliding block 261, a spacer received within the sliding block 261, a lever 263, a pin 264, a bolt 265 and a spring 266.

The sliding block 261 can be slidably disposed within the receiving groove 244. The sliding block 261 can include a first side 2611 facing the groove bottom 2441 of the receiving groove 244, a second side 2612 opposite to the first side 2611, and two third sides 2613 perpendicularly connected to the first side 2611 and the second side 2612. The two third sides are opposite to each other and substantially in parallel. A clamp fixing portion 2614 can extend from the first side 2611 in a direction towards the groove bottom 2441. The clamp fixing portion 2614 can protrude out from the first side 2611, and therefore form an inclined surface 2615 which inclines out relative to the first side 2611. In some embodiments, when the sliding block 261 slides towards the groove bottom 2441, a sliding groove (not shown) having an identical shape and a size with the first sliding groove 2430 can be formed between the first surface 241 of the mounting plate 24 and the inclined surface 2615. A second sliding portion 2616 can be provided on the third side 2613 at a position that corresponds to the first sliding portion 2443. In some embodiments, each one of the two second sliding portions 2616 can be a slider.

A first receiving groove 2617, which has a shape of two squares having one inside the other, can be formed on the second side 2612. A central portion of the first receiving groove 2617 can form a cylinder 2618 having an outer side which is coplanar with the second side 2612. The cylinder 2618 can be provided with a circular through-hole 2619.

The shape and size of a spacer 262 can respectively match the shape and size of the first receiving groove 2617. A thickness of the spacer 262 can be greater than or equal to a depth of the first receiving groove 2617. In some embodiments, the thickness of the spacer 262 can be greater than the depth of the first receiving groove 2617. In some embodiments, the spacer 262 can be made of polyoxymethylene (POM).

The lever 263 can include a rotating portion 2631 and a pulling portion 2632 which is distal to the rotating portion 2631. A first receiving portion 2634 can be formed extending from the rotating portion 2631 towards the pulling portion 2632. The first receiving portion 2634 can penetrate through the rotating portion 2631. A first through-hole 2633 can be provided at a side of the rotating portion 2631, an axial direction of which can be perpendicular to the axial direction of the through-hole 2619 of the sliding block 261. The first receiving portion 2634 can be in communication with the first through-hole 2633.

A shape and size of a pin 264 can respectively match the shape and size of the first through-hole 2633. In some embodiments, a second through-hole 2640 can be provided at a central portion of the pin 264.

The spring 266 can be disposed between the first side 2611 of the sliding block 261 and the groove bottom 2441 of the mounting plate 24.

In assembling the pressing device 26, the pin 264 can be inserted into the first through-hole 2633, and then, the spacer 262 can be disposed within the first receiving groove 2617. A bolt 265 can sequentially pass through the second through-hole 2640, the through-hole 2619 and the spring 266, and reach the threaded hole 2440 on the groove bottom 2441 of the mounting plate 24. The bolt 265 can then be screwed into the threaded hole 2440. The sliding block 261 can be received in the notch 2431 and the receiving groove 244. The rotating portion 2631 of the lever 263 can abut against the spacer 262.

The second sliding groove 250 of the supporting plate 25 can match the first sliding groove 2430 of the mounting plate 24, such that the supporting plate 25 can slide on the mounting plate 24. The lever 263 can be pressed to secure the supporting plate 25 within the mounting plate 24. In particularly, guided by a mating of the two second sliding portions 2616 and the two first sliding portions 2443, the sliding block 261 can slide towards the groove bottom 2441 within the receiving groove 244. The clamp fixing portion 2614 of the sliding block 261 is then fixedly inserted within the second sliding groove 250, such that the supporting plate 25 is tightened within the mounting plate 24. In this tightened state, the inclined surface 2615 can be received within the notch 2461. On the contrary, if the lever 263 is pulled and moved in a direction away from the mounting plate 24, the supporting plate 25 can be controllably released from the mounting plate 24, and a sliding and fixing of the supporting plate 25 can be adjusted.

In some embodiments, the spacer 262 can be made of polyoxymethylene (POM) to provide sufficient deformation and better tactile experience when the lever 263 is pressed.

The second supporting frame 40 can include two second pillars 41 and a first driving device 42. One of the second pillars 41 can be directly hinged to the rotating shaft 112 of one of the first pillars 11, while the other one of the second pillars 41 can be hinged to the rotating shaft 112 of the other one of the first pillars 11 through the first driving device 42. In some embodiments, the first driving device 42 can be disposed at one end of the second pillar 41 adjacent to the first pillar 11. A driving shaft (not shown) of the first driving device 42 can be fixedly connected with the rotating shaft 112 of one of the first pillars 11 to drive a rotation of the rotating shaft 112, so as to drive a rotation of the first supporting frame 10. In some embodiments, an axial direction of the driving shaft of the first driving device 42 is substantially perpendicular to a longitudinal direction of the second pillar 41. The first driving device 42 can drive a rotation of the first supporting frame 10 so as to adjust a shooting angle of the imaging device 200. A rotating speed of the first driving device 42 can be adjusted to adapt to various attitudes of the imaging device 200. In some embodiments, the first driving device 42 can be a brushless motor. Alternatively, the first driving device 42 can be a brush motor or other suitable motors, without a limitation to any particular embodiment.

The third supporting frame 40a can include a third pillar 43, a second driving device 44 and a connecting plate 45. In some embodiments, the third pillar 43 can be a hollow cylinder. The second driving device 44 can be rotatably connected to the second pillars 41 to drive a rotation of the second supporting frame 40. In some embodiments, the second driving device 44 can be fixed to one end of the third pillar 43. A driving shaft (not shown) of the second driving device 44 can be fixedly connected with the second pillars 41 to drive a rotation of the second pillars 41, so as to drive a rotation of the second supporting frame 40. The other end of the third pillar 43 can be connected to the connecting plate 45. The connecting plate 45 can be substantially perpendicular to the third pillar 43 and substantially parallel to a rotating shaft of the second driving device 44.

In some embodiments, the driving portion 40b can be a brushless motor having a rotor connected to the connecting plate 45 and a stator fixed to the handle portion 60. The driving portion 40b can be configured to drive the third supporting frame 40a to rotate 360° in the horizontal direction.

The handle portion 60 can be a bent rod. In some embodiments, the handle portion 60 can include a first connecting portion 601, a first supporting portion 602 and handheld portions 603. In some embodiments, the first supporting portion 602 can be a rod, and the first connecting portion 601 can be fixedly connected to a geometric center of the first supporting portion 602. The first connecting portion 601 can be connected to the driving portion 40b.

The handheld portions 603 can include two cylindrical handles which are provided to two ends of the first supporting portion 602.

The handle portion 60 can include a handle 604. The handle 604 can be fixed at one side of the first supporting portion 602 in opposition to the first connecting portion 601. The handle 604 can facilitate a transport of the gimbal 100 when it is not in use. Alternatively, the handle portion 60 can be provided with a locking mechanism for a fixation on an aerial ladder to enable an automatic movement of the gimbal 100 by machinery equipment.

Referring to FIG. 5, when the gimbal is in use, an imaging device 200 can be fixedly arranged on the locking device 20. In order to increase a stability performance of the imaging device 200 during imaging operation, a center of gravity of the first supporting frame 10, the locking device 20 and the imaging device 200 as a whole should fall on a rotating axis of the first driving device 42. Known from mechanical analysis, in a case when the center of gravity of the first supporting frame 10, the locking device 20, and the imaging device 200 as a whole falls on the driving shaft of the first driving device 42, no driving torque is generated at the first support 10 regardless of the rotation angle thereof. That is, the first supporting frame 10 does not swing by a torque, such that a stability of the imaging device 200 during rotating can be increased.

When the gimbal 100 operates steadily, the first supporting frame 10 and the imaging device 200 is also in a dynamically balanced state. However, if the center of gravity of the first supporting frame 10, the locking device 20, and the imaging device 200 as a whole does not fall on the rotating axis of the first driving device 42, the lever 263 can be pulled to move in a direction away from the mounting plate 24. That is, the supporting plate 25 is released from the mounting plate 24 by sliding. The supporting plate 25 can then slide on the mounting plate 24 to finely adjust the center of gravity of the first supporting frame 10, such that the center of gravity of the first supporting frame 10, the locking device 20 and the imaging device 200 as a whole falls on the rotating axis of the first driving device 42.

It will be appreciated that, in some embodiments, the first sliding portions 2443 can be sliders, while each one of the second sliding portions 2616 can be a sliding groove.

It will be appreciated that, in some embodiments, no first sliding portions 2443 and second sliding portions 2616 can be provided.

In the present disclosure, the supporting plate of the locking device can be slidably disposed on the mounting plate, and the supporting plate can be tightened with the mounting plate by the pressing device. Therefore, the mounting plate can be tightened at an arbitrary position on the supporting plate by the locking device. The locking precision of the mounting plate can be improved. The locking device is small in size and easy to assemble and disassemble. The gimbal can enable the supporting plate to slide on the mounting plate by the locking device, so as to finely adjust the center of gravity of the first supporting frame. The center of gravity of the first supporting frame, the locking device and the imaging device as a whole falls on the rotating axis of the first driving device, such that the center of gravity of the gimbal can be quickly adjusted. Therefore, the center of gravity of the gimbal can be adjusted by the locking device.

The foregoing disclosure is merely illustrative of the embodiments of the present disclosure but not intended to limit the scope of the present disclosure. Any equivalent modifications to a structure or process flow, which are made without departing from the specification and the drawings of the present disclosure, and a direct or indirect application in other relevant technical fields, shall also fall into the scope of the disclosure.

What is claimed is:

1. A locking device, comprising:
  a mounting plate;
  a supporting plate, slidably on the mounting plate and configured to mount an imaging device; and
  a pressing device, comprising a sliding block; and
  a bolt;
  wherein:
    the mounting plate comprises a first surface and two first sidewalls which are opposite to each other, two first bosses extending respectively at two opposite sides of the first surface, two first sliding grooves being respectively at inner sidewalls of the two first bosses, and a receiving groove being at one of the two first sidewalls;
    the supporting plate contains two second sliding grooves respectively on two outer sidewalls thereof at positions corresponding to the first sliding grooves of the mounting plate, each of the two second sliding grooves matching one of the first sliding grooves;
    the sliding block is slidably disposed within the receiving groove and comprising: a first side in proximity to the groove bottom of the receiving groove, a second side opposite to the first side, and a clamp fixing portion extending from the first side in a direction towards the groove bottom and configured to lock the supporting plate with the mounting plate, wherein when the sliding block is held within one of the second sliding grooves, the supporting plate is tightened with the mounting plate by the clamp fixing portion;

the second side of the sliding block is provided with a first receiving groove, the first receiving groove formed with a square indentation with a raised square cylinder placed at a center of the square indentation, the square indentation having a cross-section area greater than a cross-section area of the square cylinder; and the square cylinder has an outer side coplanar with the second side of the sliding block and a circular through-hole for the bolt to pass, the circular through-hole being perpendicular to the second side of the sliding block.

2. The locking device of claim 1, wherein the first sliding grooves and the second sliding grooves are dovetail grooves.

3. The locking device of claim 1, wherein the groove bottom of the receiving groove is provided with a threaded hole, and the locking device further comprises a spring, a pin and a lever; the spring is disposed between the groove bottom and the first side; the lever is disposed at the second side and provided with a first through-hole for receiving the pin; the pin has a second through-hole in a center portion of the pin, and the bolt sequentially passes through the second through-hole of the pin, the circular through-hole of the square cylinder, and the spring and is threadedly connected with the threaded hole.

4. The locking device of claim 3, wherein the locking device further comprises a spacer having a shape and a size respectively match a shape and a size of the first receiving groove; and the spacer is received within the first receiving groove and contacts with the lever.

5. The locking device of claim 4, wherein a thickness of the spacer is greater than or equal to a depth of the first receiving groove.

6. The locking device of claim 4, wherein the spacer is made of polyoxymethylene (POM).

7. The locking device of claim 1, wherein the receiving groove comprises two groove sides disposed perpendicular to the groove bottom and opposite to each other; two first sliding portions are respectively disposed on the two groove sides; two second sliding portions are respectively disposed on two outer sidewalls of the sliding block at positions corresponding to the first sliding portions, the second sliding portions matching the first sliding portions.

8. The locking device of claim 7, wherein the first sliding portions are sliding grooves, and the second sliding portions are sliders.

9. The locking device of claim 7, wherein the first sliding positions are sliders, and the second sliding portions are sliding grooves.

10. The locking device of claim 1, wherein the receiving groove is configured to extend from the one of the first two sidewalls towards a center of the first surface and run through a portion of one of the first two bosses to form a notch on the one of the two first bosses; the notch is in communication with the receiving groove; the clamp fixing portion protrudes out from the first side and forms an inclined surface which inclines relative to the first side; and when the sliding block is held within the one of the two second sliding grooves, the inclined surface is received within the notch.

11. The locking device of claim 1, further comprising a first adaptor comprising a first pressing block and a second pressing block which are disposed opposite to each other, wherein the first pressing block and the second pressing block form two circular slots there-between; the first pressing block and the second pressing block are jointly locked by a first screw; and the mounting plate is fixed on the second pressing block.

12. A gimbal for carrying an imaging device, comprising:
a first supporting frame, comprising two first pillars and two guiding posts substantially perpendicular to the two first pillars;
the locking device of claim 1, disposed on the two guiding posts for carrying the imaging device;
a second supporting frame, hinged to the first supporting frame and capable of driving a rotation of the first supporting frame; and
a third supporting frame, hinged to the second supporting frame and capable of driving a rotation of the second supporting frame.

13. The gimbal of claim 12, wherein the second supporting frame comprises two second pillars and a first driving device, one of the two second pillars is hinged to a rotating shaft of one of the first pillars, and the other one of the two second pillars is hinged to a rotating shaft of the other one of the first pillars through the first driving device.

14. The gimbal of claim 13, wherein the third supporting frame comprises a third pillar, a second driving device and a connecting plate; the second driving device is rotatably connected to the second pillars to drive the second supporting frame; the second driving device is fixed to one end of the third pillar; and the other end of the third pillar is connected to the connecting plate.

15. The gimbal of claim 14, further comprising a driving portion and a handle portion, wherein the driving portion is a brushless motor having a rotor connected to the connecting plate and a stator fixed to the handle portion, and the driving portion drives a rotation of the third supporting frame.

16. The gimbal of claim 12, wherein the first sliding grooves and the second grooves are dovetail grooves.

17. The locking device of claim 12, wherein the groove bottom of the receiving groove is provided with a threaded hole, and the locking device further comprises a spring, a bolt, a pin and a lever; the spring is disposed between the groove bottom and the first side; the lever is disposed at the second side and provided with a first through-hole for receiving the pin; and the bolt sequentially passes through the pin, the sliding block and the spring and is threadedly connected with the threaded hole.

18. The gimbal of claim 17, wherein the second side is provided with a first receiving groove having a shape of two squares with one inside the other; the central portion of the first receiving groove forms a cylinder having a circular through-hole, the bolt passing through the circular through-hole; the locking device further comprises a spacer having a shape and a size respectively match a shape and a size of the first receiving groove; and the spacer is received within the first receiving groove and contacts with the lever.

19. The gimbal of claim 18, wherein a thickness of the spacer is greater than or equal to a depth of the first receiving groove.

20. The gimbal of claim 18, wherein the spacer is made of polyoxymethylene (POM).

21. The gimbal of claim 12, wherein the receiving groove comprises two groove sides disposed perpendicular to the groove bottom and opposite to each other; two first sliding portions are respectively disposed on the two groove sides; and two second sliding portions are respectively disposed on two outer sidewalls of the sliding block at positions corresponding to the first sliding portions, the second sliding portions matching the first sliding portions.

22. The gimbal of claim 21, wherein the first sliding portions are sliding grooves, and the second sliding portions are sliders.

23. The gimbal of claim 21, wherein the first sliding positions are sliders, and the second sliding portions are sliding grooves.

24. The locking device of claim 12, wherein the receiving groove is configured to extend from the one of the first two sidewalls towards a center of the first surface and run through a portion of one of the first two bosses to form a notch on the one of the two first bosses; the notch is in communication with the receiving groove; the clamp fixing portion protrudes out from the first side and forms an inclined surface which inclines relative to the first side; and when the sliding block is held within the one of the two second sliding grooves, the inclined surface is received within the notch.

25. The gimbal of claim 12, wherein the locking device further comprises a first adaptor comprising a first pressing block and a second pressing block which are disposed opposite to each other; two circular slots are formed between the first pressing block and the second pressing block; the first pressing block and the second pressing block are jointly locked by a first screw; and the mounting plate is fixed on the second pressing block; and wherein the first adaptor is fixed on the guiding posts if the first screw is tightened, and locking device is capable of sliding on the guiding posts along a longitudinal direction thereof, if the first screw is released.

* * * * *